United States Patent [19]

Harada et al.

[11] 3,843,851

[45] Oct. 22, 1974

[54] A RIGID COMPACT ELECTRONIC COMPUTER

[75] Inventors: Yuji Harada; Akihiko Yoshizawa, both of Tokyo, Japan

[73] Assignee: Canon Kabushiki Kaisha, Tokyo, Japan

[22] Filed: Sept. 8, 1972

[21] Appl. No.: 287,453

[30] Foreign Application Priority Data

Sept. 17, 1971 Japan .............................. 46-84768

[52] U.S. Cl. .............................. 200/5 E, 200/340

[51] Int. Cl. .............................. H01h 3/12

[58] Field of Search ....... 317/101 CB, 101 DH, 120, 317/99, 112; 200/5 R, 5 A, 5 E, 166 PC, 340

[56] References Cited

UNITED STATES PATENTS

| | | | |
|---|---|---|---|
| 3,147,555 | 9/1964 | Dufendach | 200/5 R |
| 3,609,464 | 9/1971 | Stone | 317/101 DH |
| 3,617,661 | 11/1971 | Nome | 200/5 E |
| 3,627,935 | 12/1971 | Spievak | 200/5 A |
| 3,641,286 | 2/1972 | Berezowski | 200/5 A |
| 3,706,863 | 12/1972 | Britton | 200/5 E |
| 3,711,814 | 1/1973 | Pomella | 317/101 DH |

*Primary Examiner*—Robert K. Schaefer
*Assistant Examiner*—Gerald P. Tolin
*Attorney, Agent, or Firm*—Fitzpatrick, Cella, Harper & Scinto

[57] ABSTRACT

A compact electronic computer comprises a keyboard including digit and function keys, a switch opened and closed by said keys, and a circuit panel for directing electrical signals produced by the switch into the computer. Side plates are secured to the keyboard, the side plates having grooves for guiding and holding a printed circuit panel carrying thereon operation elements. A multijack is secured to the side plates, the multijack including, at least, a means for directing the electrical signals from the circuit panel of the keyboard to the printed circuit panel carrying the operation elements.

8 Claims, 11 Drawing Figures

A RIGID COMPACT ELECTRONIC COMPUTER

BACKGROUND OF THE INVENTION

1. Field of the Invention

This invention relates to an assembled compact electronic computer structure, and more particularly to a compact electronic computer structure which is simple in construction and simplified to fabricate and assemble as well as easy to inspect or repair.

2. Description of the Prior Art

These years, compact electronic computers have been in the tendency toward further miniaturization in accordance with the developments of the IC technology, and some of them have been extremely miniaturized even to a pocket size.

Such miniaturization has unavoidably involved a further compactness and complexity of interior arrangement and construction. This has also led to much more complicated procedures for the fabrication and assemblage of such computers, and accordingly to a higher cost of manufacture and greater difficulties required in the repair or replacement of components.

SUMMARY OF THE INVENTION

It is therefore a primary object of the present invention to provide a compact electronic computer which has an improved construction to eliminate the above-noted disadvantages.

It is another object of the present invention to provide a compact electronic computer which is light in weight and has a rigid construction suitable for portage.

It is still another object of the present invention to provide a compact electronic computer which is highly rigid and easy to assemble because the basic structural portion thereof comprises a multijack, a keyboard and side plates with the other members disposed therearound and therewithin.

It is a further object of the present invention to provide a compact electronic computer whose keyboard and main side plates can be securely connected together in a very rational manner, that is, a compact electronic computer in which various members forming the main body have the smallest possible thicknesses and a metal plate is adequately provided to maintain their strength sufficiently.

It is still a further object of the present invention to provide a compact electronic computer which is highly effective in that a grounded metal plate provided in the main body so as to shield extraneous noises and to prevent outward leakage of internal noises also serves as a reinforcing plate and upper and lower covers for maintaining the strength of the main body.

BRIEF DESCRIPTION OF THE DRAWINGS

Other objects and features of the present invention will become apparent from the following detailed description taken in conjunction with the accompanying drawings, in which.

DESCRIPTION OF THE PREFERRED EMBODIMENTS

Figure 1:
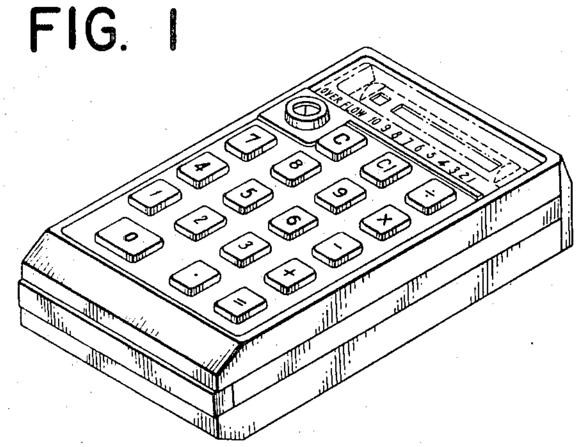
FIG. 1 is a perspective view schematically showing the entire appearance of the compact electronic computer according to the present invention.
Figure 3:
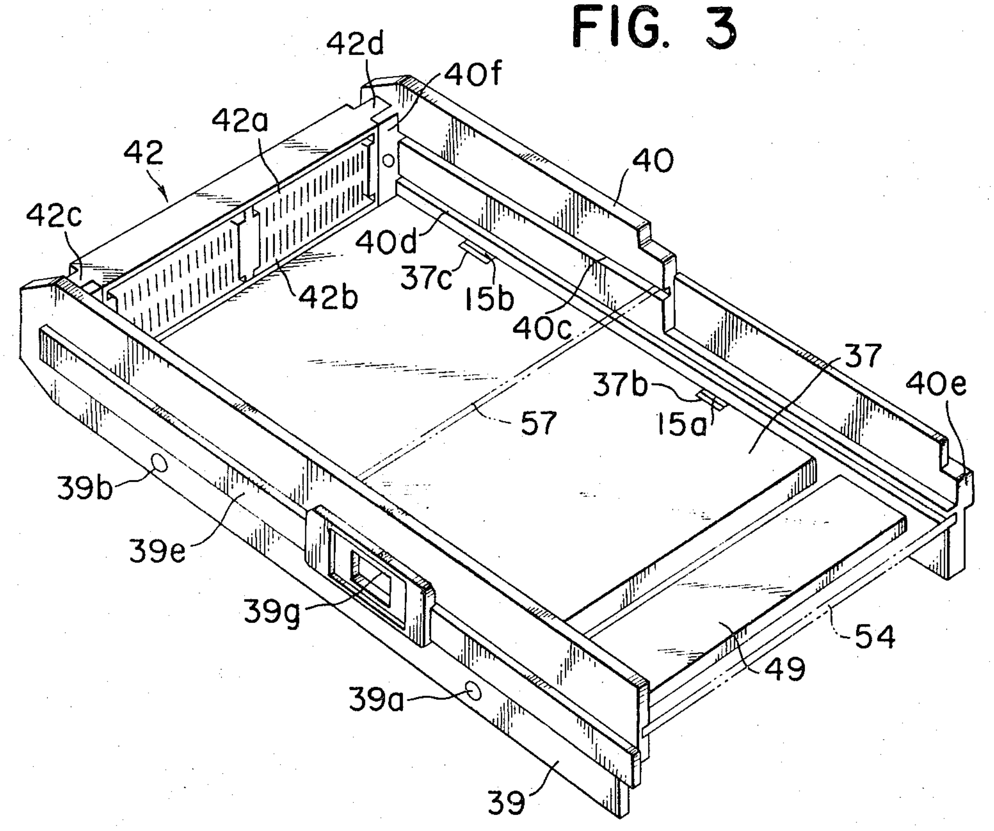
FIG. 3 is a perspective view of the assembled basic structural portion of the present invention as viewed from the back side thereof.
Figures 2, 2C:
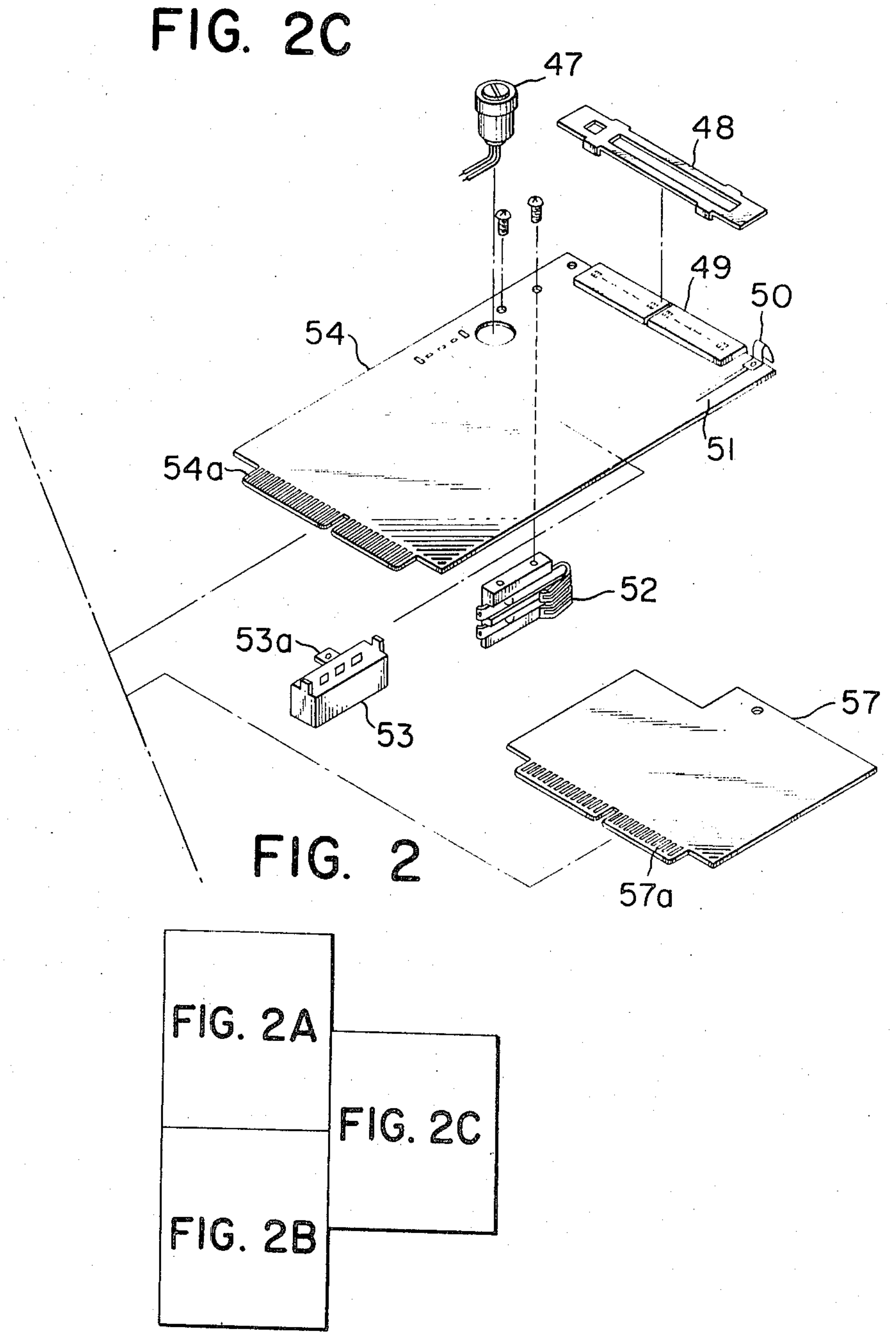
FIG. 2 is a view of the assembly of the elements of FIGS. 2A, 2B and 2C.
FIG. 2C is an exploded perspective view the logic panels.
Figure 2A:
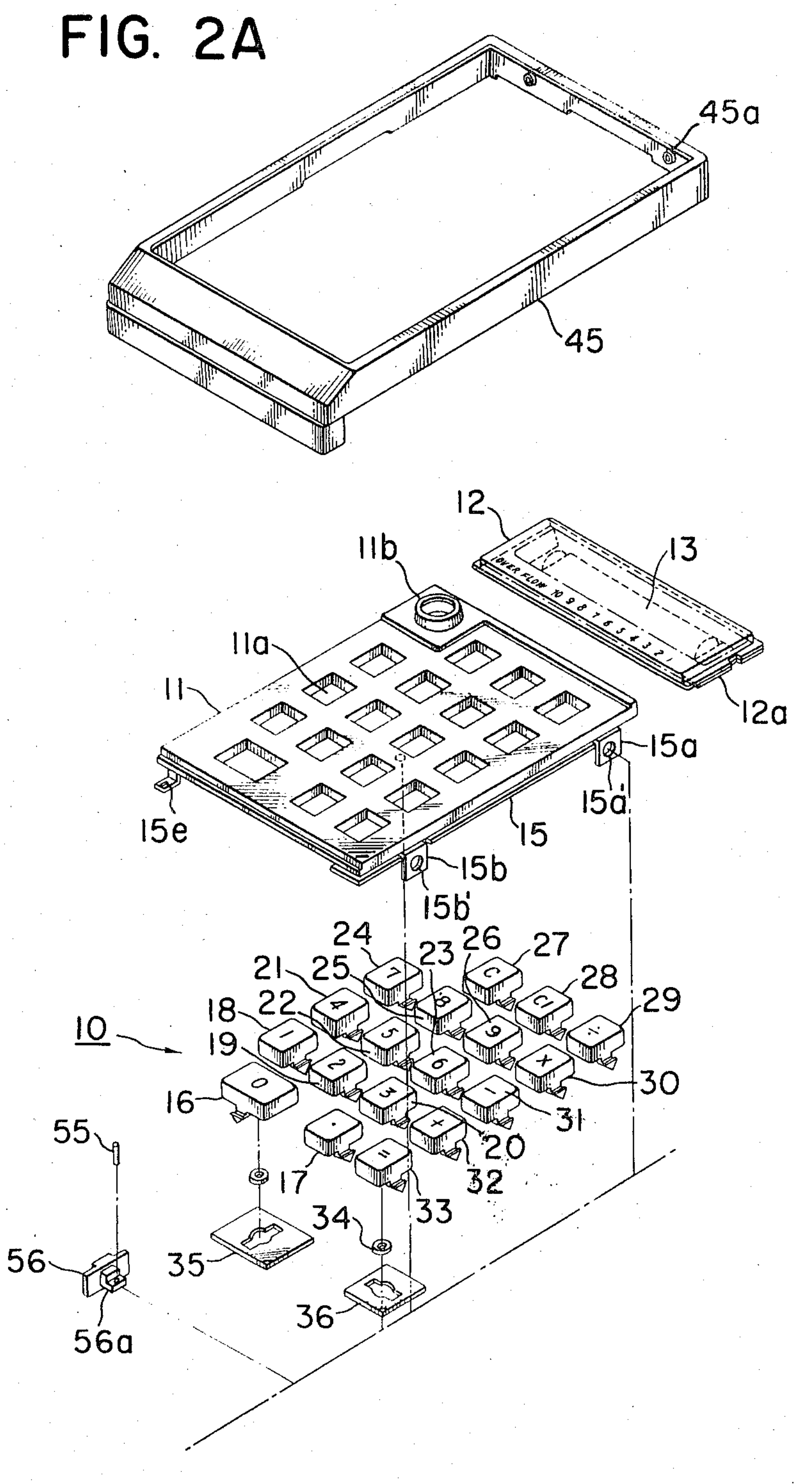
FIG. 2A is an exploded perspective view of the FIG. 1 computer.
Figure 2B:
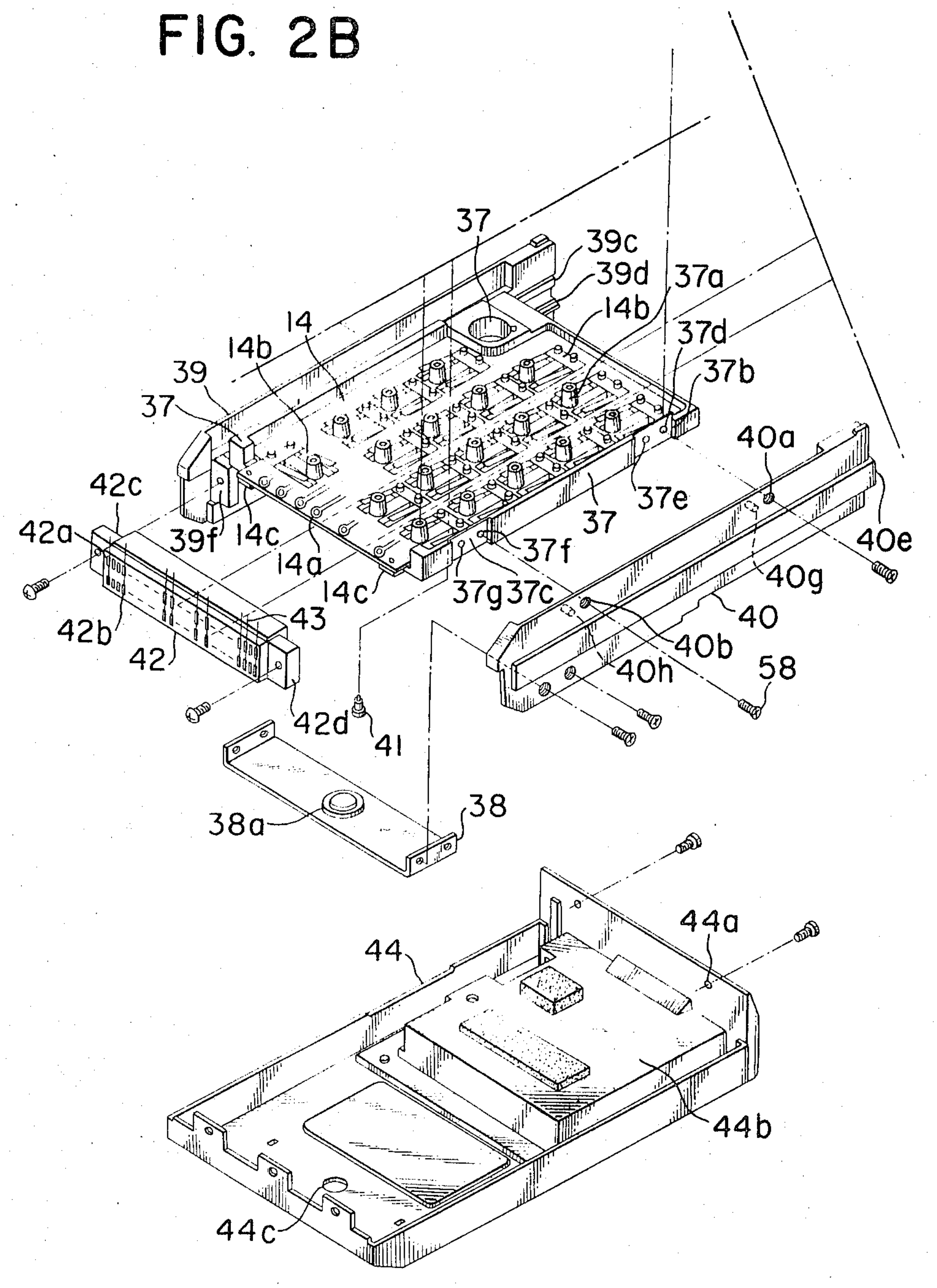
FIG. 2B is an exploded perspective view of side plates and printed circuit panel assembly.

The construction of the electronic computer of the present invention will generally be described with reference to FIG. 2. The computer includes an outer panel 11 provided with key top reception apertures 11a and forming a keyboard top surface. The outer panel 11 is aesthetically dressed with plastics or like material, and a reinforcing plate 15 of metal or like material provided with apertures corresponding to the key top reception apertures 11a is secured to the bottom surface of the panel 11. The reinforcing plate 15 is also provided with bent members 15*a*, 15*b*, 15*c*, and 15*d* for securely holding main side plates 39 and 40. Further provided are groups of digit and function keys 16–33 and dust-proof and buffer members 35, 36 formed of elastic material such as rubber or the like. A circuit panel 14 carries thereon a plate spring 14*b* forming one of switch electrodes and a printed circuit formed of metal foil. A piece of metal 14*c* forming the other switch electrode which is grounded is attached to the back side of the circuit panel 14. Electrical connection may be established between 14*a* and 14*c* upon depression of any one of the keys. The reinforcing plate 15 is provided with a further bent member 15*e*, which may be electrically connected with the metal piece 14*c* to thereby maintain the reinforcing plate 15 at the ground potential and enlarge the area of the grounded electrode as well as to interrupt extraneous noises and prevent outward emission of internal noises. The printed circuit panel 14 is securely supported by a support plate 37. The support plate 37 is formed with guide cylinders 37*a* for guiding and securely receiving the stems of the keys, and provides the bottom surface of the keyboard. The support plate 37 is secured to the outer panel 11 as by screws 41. Thus, the keyboard 10 is constituted by the outer panel 11, reinforcing plate 15, keys 16–33, elastic buffer members 35, 36, circuit panel 14, support plate 37, etc.

The main side plates 39 and 40 are aesthetically dressed with plastics or like material, and provided with grooves 39*c*, 39*d*, 40*c*, 40*d* for guiding and holding printed circuit panels 54 and 57 to which a logic operation circuit and other circuit elements are attached, and strip-like projections 39*e* and 40*e* for engagement with lower and upper covers 44 and 45. The side plates 39 and 40 are further provided with stops 39*f* and 40*f* for securely receiving a multijack 42 for connecting and holding the printed circuit panels 54 and 57. The side plates 39 and 40 are also provided with screw reception holes 39*a*, 39*b*, 40*a*, 40*b* and adjacent pins 39*g*, 39*h*, 40*g*, 40*h* projected toward the keyboard. The support plate 37 is formed with holes 37*d*, 37*f* and 37*e*, 37*g* which correspond to the holes 40*a*, 40*b* and pins 40*g*, 40*h* of the side plate 40, respectively. The holes 37*d*, 37*f* are not threaded but only provide escape passages for screws 58. The holes 37*e* and 37*g* may snugly receive the pins 40*g* and 40*h* formed on the side plate 40. At the locations of the side of the support plate 37 where the holes 37*d*, 37*e* and 37*f*, 37*g* are formed, there are formed recessed portions 37*b* and 37*c* for receiving the bent members 15*a* and 15*b* of the reinforcing plate 15. The hole 37*e* is not circular but is in the form of elongated slot so as to permit the correction of position. The side plate 39 is simply symmetrical and identical in construction with the side plate 40.

The pins 40*g* and 40*h* serve to prevent warping or distortion of the support plate 37 and circuit panel 14 and maintain their flatness. The bent members 15*a* and 15*b* of the metallic reinforcing plate 15 are formed with holes 15*a'* and 15*b'*, which are internally threaded for threadably and firmly receiving screws 58 passing through the holes 40*a* and 40*b* of the side plate 40. The firm engagement between the holes 15*a'*, 15*b'* and the screws 58 is also useful to prevent the warping or deformation of the outer panel 11 and of the reinforcing plate 15.

In a conventional portable computer, the keyboard formed of resilient material such as plastics was provided with threaded holes through which screws were passed to secure the side plates directly to the keyboard, and this caused the loosening, deformation and/or fragility of the computer body. The reason is that the casing of a compact portable computer must be formed of a thinnest possible sheet member.

According to the present invention, a reinforcing plate of metal is adequately disposed in the manner described above and this is useful to provide a highly effective structure for the compact portable computer whose major portion must be made of high molecular material such as plastics or the like.

Furthermore, such reinforcing plate 15 also serves as a noise shielding member and provides a very desirable effect in practical use.

The multijack 42 has socket portions 42*a* and 42*b* corresponding to the plug portions 54*a* and 57*a* of the printed circuit panels 54 and 57. The socket portions 42*a* and 42*b* are electrically connected together and accordingly they electrically connect the circuit panels 54 and 57 with each other.

Between those of the socket portions 42*a* and 42*b* which are directed to the electrical connection with the keyboard printed circuit panel 14, there extend metal wires 43 whose ends are received into holes in respective printed lines 14*a* in the printed circuit panel 14 and secured thereto by soldering to establish electrical connection. Thereafter, the stops 39*f*, 40*f* of the side plates 39, 40 and the stops 42*c*, 42*d* of the multijack 42 are secured to each other as by screws.

Thus, the major portion of the computer of the present invention can provide an extremely compact and rigid structure.

Subsequently, such major portion may have various accessories simply inserted thereinto or superposed thereon, thus completing an entire unit.

Figures 5, 6:
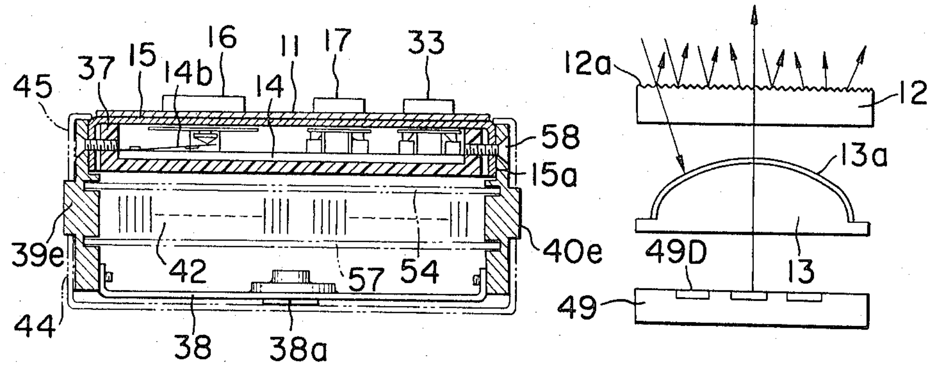
FIG. 5 is a sectional view taken along lines V—V of FIG. 4.
FIG. 6 is a view for illustrating the construction of the indicator portion for indicating numerical values.

The printed circuit panel 54 carries thereon a logic operation circuit element 60, a battery checker 47, an indicator 49, a grounding plate spring electrode 50, a jack 52 for connection with a power source, a power switch 53, etc. Overlying the indicator 48 is a mask 48, which in turn is overlain by a magnifier lens 13, a holder plate 12*a* for the lens 13, and a transparent protective glass plate 12. The indicator 49 comprises a luminous diode emitting red light. Therefore, a design as specifically shown in FIG. 6 has been made so as to permit the values indicated by the luminous diode to be readily viewed. More specifically, the surface of the magnifier lens 13 is provided with an antireflection film 13*a* and the surface of the transparent protective glass plate 12 is subjected to a non-glare treatment as at 12*a*, it being understood that the light emitted from the luminous diode 49D is passed and magnified through the magnifier lens 13 and viewed through the transparent protective glass 12. Further, by providing the magnifier lens 13 or the transparent protective glass 12 with a function as a filter, the indicator may be made more readily visible. For example, the lens 13 or the glass 12 may be formed as a band-pass filter ready to pass the emitted wavelength (red wavelength) from the luminous diode 49D, whereby the accessories such as the circuit and terminals on the indicator 49 may not appear around the luminous diode 49D but characters or numerals alone may be clearly read out. In this arrangement, the spacing between the luminous diode 47D and the magnifier lens 13 and the spacing between the magnifier lens 13 and the transparent protective glass 12 may most preferably be 2 to 3 mm and 3 mm, respectively.

Figure 7:
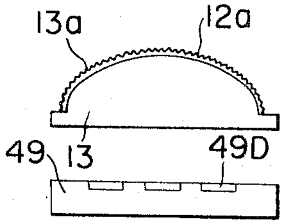
FIG. 7 shows another form of the indicator portion.

FIG. 7 shows another form of the indicator portion wherein the antireflection film 13*a* of the lens 13 is either provided with a non-glare treated film or directly subjected to a non-glare treatment.

The printed circuit panel 54 has a power switch 53 attached to the underside thereof, as mentioned previously. The power switch 53 should desirably be located within the area of the printed circuit panel 54 and as nearest to the marginal edge thereof as possible, because the circuit panel 54 must be able to be smoothly inserted and removed. Closing and opening of the power switch 53 may be accomplished by moving the movable portion 53*a* thereof. For this purpose, an extraneously operable knob 56 is inserted through the hole 39*g* formed in the side plate 39, whereafter a stop 56*a* formed on the operable knob 56 is securely connected to the movable portion 53*a* of the switch 53 by means of a connecting pin 55. Thus, the printed circuit panel 54 can be quite readily removed from the multijack 42 for the purpose of inspection or repair, simply by withdrawing the connecting pin 55, without the need to remove the power switch 53 from the circuit panel 54 as was conventionally required.

The assemblage may all be completed simply by attaching a metallic spacer 38 for the side plates and lower and upper covers 44 and 45. The spacer 38 is formed with an opening 38*a* through which a charging-operating bed (not shown) may be attached.

Figure 8:
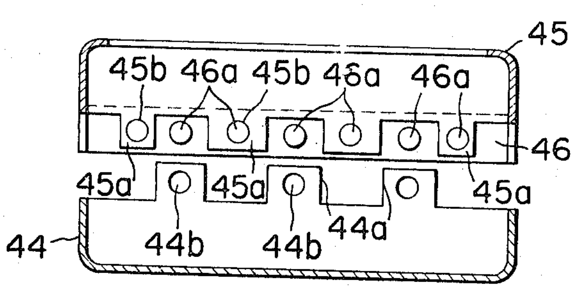
FIG. 8 is a side view showing the manner in which the upper and lower covers are connected together.

The upper and lower covers 45 and 44 may be connected together in a very rational manner as shown in FIG. 8. The side walls of the upper and lower covers 45 and 44 are provided with connecting pieces 45*a* and 44*a* which are in the form of comb-teeth and in staggered relationship, each of the connecting pieces being formed with a connecting hole 45*b* or 44*b*. A plurality of pins 46*a* for connecting the two covers is provided in a row on a connector member 46. Every other pin 46a corresponding to each connecting piece 45a is fitted and caulked in each associated hole 45b of the connecting pieces 45a to thereby secure the connector member 46 to the upper cover 45. On the other hand, the other pins 46a are centered so as to fit in the connecting holes 44b formed in the connecting pieces 44a of the lower cover 44, thereby connecting the upper and lower covers 45 and 44 to each other. The two covers 44 and 45 so connected together are placed on the unit body with the strip-like projections 39e, 40e of the side plates 39, 40 held by the sidewalls of the covers. Then, the connecting holes 45a in the upper cover 45 and the connecting holes 44a in the lower cover 44 are aligned with each other, whereafter screws are inserted into the aligned holes, thereby completing the assembly of the entire unit.

Figure 4:
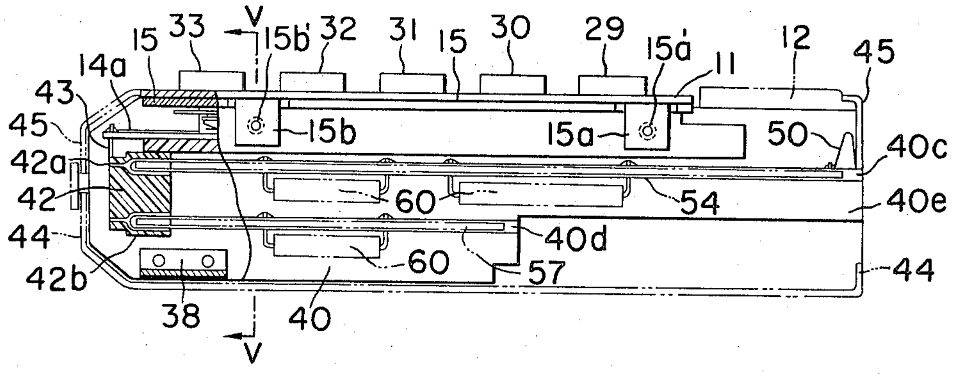
FIG. 4 is a longitudinal section of FIG. 1.

The upper and lower covers 45 and 44 formed of metal have a function equivalent to or greater than the first function of the reinforcing plate 15, i.e., the function of maintaining or increasing the strength of the compact electronic computer which basically comprises members of high molecular material such as plastics or the like. Further, it should specially be noted that the two covers 44 and 45 are effective to enhance the second function of the reinforcing plate 15, i.e., the function as a noise shield. This is because, as shown in FIGS. 2 and 4, the grounding plate spring electrode 50 provided on the printed circuit panel 54 is electrically connected with the metallic upper cover 45 to maintain the ground potential through the body of the operator or through the desk on which the computer may rest. The printed lead wire 51 from the electrode 50 is connected with the electrode 14c of the keyboarad circuit panel 14 to form an earth line. The plate spring electrode 50 can also urge the upper cover 45 to hold the latter.

We claim:

1. A compact electronic computer comprising:
   - a keyboard assembly including a plurality of key tops for entering inputs of numerical data and execution orders, an outer panel having a plurality of openings at positions corresponding to said plurality of key tops fitted therein, a plurality of switches each of which is disposed below each of said key tops fitted in the openings of said outer panel and being operated by the depression of a corresponding key top, a first printed circuit panel for introducing electric signals generated by said switches into said computer, and a support plate supporting thereon said first printed circuit panel;
   - a second printed circuit panel having arranged thereon a plurality of operation elements and forming electric connections between said operation elements;
   - a pair of slide plates, each of which includes a first supporting portion supporting said support plate and is provided with a first groove guiding and supporting said second printed circuit panel;
   - a multijack including a first retaining portion retaining said pair of side plates parallel and a first connecting portion electrically connecting said first printed circuit panel to said second printed circuit panel;
   - first fixing means for fixing said multijack and said pair of side plates at said first retaining portion, and
   - second fixing means for fixing said support plate and said pair of side plates at said first supporting portion.

2. A compact electronic computer according to claim 1, further comprising a transparent glass plate mounted on said side plates for viewing a luminous indicator provided in said computer.

3. A compact electronic computer according to claim 2, wherein said transparent glass plate comprises an antireflective film on the surface thereof.

4. A compact electronic computer according to claim 1, further comprising a third printed circuit panel mounted between said side plates and having arranged thereon a plurality of operation elements and forming electric connections between said operation elements, and, wherein, said multijack further includes a second connecting portion electrically connecting said third printed circuit panel to said second printed circuit panel.

5. A compact electronic computer according to claim 1, further comprising a reinforcing plate of metal having a plurality of openings corresponding to said plurality of openings of said outer panel and attached to said outer panel.

6. A compact electronic computer according to claim 5, further comprising means for electrically connecting said operation elements to said reinforcing plate so as to maintain said reinforcing plate at the ground potential.

7. A compact electronic computer according to claim 1, further comprising an outer case electrically connected to the ground potential of said operation elements for shielding external noises.

8. A compact electronic computer according to claim 1, further comprising:
   - a power switch provided on said first printed circuit panel,
   - a movable member provided in said power switch,
   - a window provided in one of said pair of side plates adjacent to said movable member,
   - an operating member inserted in said window for operating said movable member to close and open said power switch, and
   - connecting means for connecting said operating member to said movable member.

* * * * *